United States Patent [19]

Mignot

[11] Patent Number: 4,746,336
[45] Date of Patent: May 24, 1988

[54] GAS FILTRATION UNIT

[76] Inventor: Guy F. Mignot, Mignot Industries, c/o Telbot Fishing, Old Pavillion Street, New Mauritius Docks, Port Louis, Mauritius

[21] Appl. No.: 17,699

[22] Filed: Feb. 23, 1987

[30] Foreign Application Priority Data

Feb. 24, 1986 [ZA] South Africa .................. 86/1365

[51] Int. Cl.$^4$ .......................................... B01D 47/02
[52] U.S. Cl. ...................................... 55/225; 55/227; 55/244; 55/260
[58] Field of Search .................. 55/219, 225–227, 55/244, 248, 253, 260; 261/70, 119.1

[56] References Cited

U.S. PATENT DOCUMENTS

| | | | |
|---|---|---|---|
| 919,249 | 4/1909 | Ruddiman | 55/260 X |
| 1,200,202 | 10/1916 | Kroyer | 55/260 X |
| 1,214,372 | 1/1917 | Romberger | 55/248 X |
| 1,664,333 | 3/1928 | Taylor | 55/248 |
| 1,817,265 | 8/1931 | Pando | 55/244 X |
| 1,946,291 | 2/1934 | Miller | 55/225 |
| 2,403,545 | 7/1946 | Nutting | 55/227 X |
| 3,517,485 | 6/1970 | Dell'Agnese et al. | 55/226 |
| 3,766,717 | 10/1973 | Belt | 55/227 X |
| 3,980,080 | 9/1976 | Muto | 55/244 X |
| 4,224,042 | 9/1980 | Garigioli | 55/253 X |

FOREIGN PATENT DOCUMENTS 510200  4/1952  Belgium .............................. 55/219

Primary Examiner—Robert Spitzer
Attorney, Agent, or Firm—Robert R. Jackson

[57] ABSTRACT

According to the invention a gas filtration unit comprises a liquid container (10) and a number of intake gas inlet tubes (32) which extend downwardly into the container (10) and opening just above a high liquid level (24) within the container. A filtered gas outlet (20) is formed above the high liquid (24) level in the container and a displacer (38) connected to a choke vane (36) is adapted automatically to vary the liquid level between the high liquid level (24) and a low liquid level (40), which is below the inlet tube opening, in dependence on the gas flow through the container.

10 Claims, 2 Drawing Sheets

GAS FILTRATION UNIT

BACKGROUND OF THE INVENTION

This invention relates to a gas filtration unit and more particularly to an intake air filtration unit for internal combustion engines.

The filtration medium used by the filter is a liquid, which may be water where the filter is applied as an intake air filtration unit for internal combustion engines. In such an application the filter serves the secondary purpose of densifying the gas by the entrainment of the liquid in vapour form.

SUMMARY OF THE INVENTION

According to the invention a gas filtration unit comprises a liquid container, at least one intake gas inlet tube, extending from a source of inlet gas downwardly into the container and opening at a high liquid level within the container, at least one filtered gas outlet formed above the high liquid level in the container and means adapted automatically to vary the liquid level between the high liquid level and a low liquid level, which is below the inlet tube opening, in dependence on the gas flow through the container.

A plurality of intake gas inlet tubes may be provided which extend substantially vertically downwardly from an intake plenum which is in communication with a source of intake gas through one or more intake gas inlets. The intake gas inlet tube or tubes may extend downwardly into the liquid, but in the preferred form of the invention the tubes open above and preferably just above, the high liquid level.

The liquid level variation means may be constituted by electronic, electromechanical or a mechanical level variation device, but in the preferred form of the invention, the filtered gas outlet includes an outlet tube extending downwardly into the container to an opening above the high liquid level and a liquid displacer element is provided and connected to a choke vane located within the outlet tube in such a manner that gas flow past the choke vane will tend to raise the vane within the outlet tube thereby raising the displacer element from the liquid to displace progressively less and less liquid.

The gas filtration unit may be configured to serve as an intake air filter for an internal combustion engine.

DESCRIPTION OF THE DRAWINGS

The invention will be further described with reference to the accompanying drawings in which.

DESCRIPTION OF EMBODIMENTS OF THE INVENTION

Figure 1:
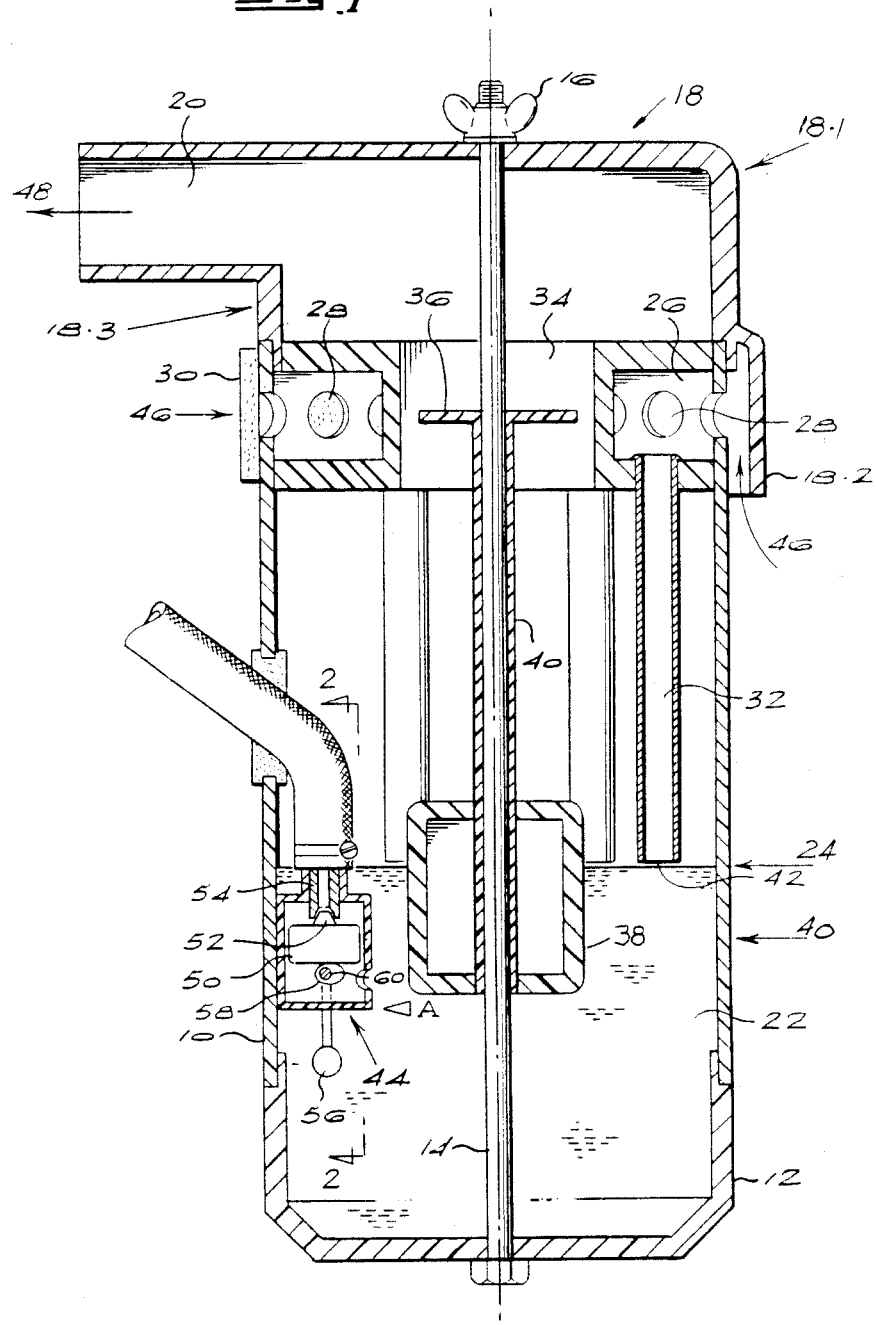
FIG. 1 is a sectional side elevation of the gas filtration unit of the invention illustrating two embodiments, one on either side of a central line.
Figure 2:
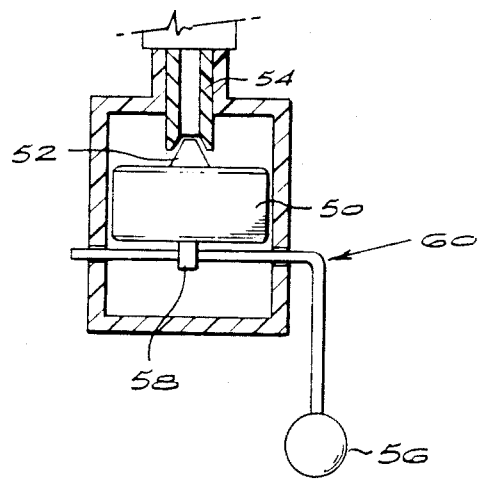
FIG. 2 is a sectional side elevation on a line 2—2 in FIG. 1.

The filtration unit illustrated is configured to serve as an intake air filtration unit for internal combustion engines and comprises a liquid container 10 with a removable base 12 secured thereto by means of a bolt 14 and wing nut 16. The latter arrangement also secures a cap 18 to the container 10, the cap 18 being formed with a filtered gas outlet 20.

The container 10 is adapted to be charged with water 22 up to a predetermined high level, which is indicated by an arrow 24.

The intake portion of the filtration unit comprises an intake plenum 26 which is open to atmosphere through intake openings 28. The unit may be configured either as a completely free flow filter by the provision of a cap 18.1 in which a skirt 18.2 provides the only cover for the inlet openings 28, or as a partially obstructed unit using a cap 18.3 which allows the use of a porous filter material 30, such as a plastics sponge material to be used as a primary cover for the intake openings 28. A plurality of air intake tubes 32 extend from the plenum downwardly towards the liquid 22 to open just slightly above the high liquid level 24.

The filtered air outlet arrangement includes an outlet tube, constituted by a choke throat 34 extending downwardly into the container 10. A choke vane 36 is located within this throat 34 and is conected to a liquid displacer 38 by means of a connecting sleeve 40. Increased air flow through the choke throat 34 and past the choke vane 36 will result in the choke vane 36 rising within the throat 34 whereby the displacer element 38 will be raised from the water 22 and, as a result, less and less water will be displaced by the element 38. In consequence, the water level will drop to a low liquid level indicated by an arrow 40, which is well below the openings 42 of the inlet tubes 32.

The displacer 38 is weighted such that the displacer, sleeve and choke vane combination floats at the desired height within the water 22.

Make-up water may be fed automatically or semi-automatically to the unit by means of a water supply tube feeding a water supply valve unit 44. Accumulated filtrate may be removed from the base 12 from time to time by removal and manual flushing of the base 12.

In operation, intake air will enter the inlet openings 28 in the direction of the arrows 46 to be drawn through the plenum 26 and the tubes 32 into the free space above the water level 24. In the process, the air is filtered, partly as a result of the filtration effect of the water temporarily entraining some air but mostly as a result of the downward acceleration of the air in the tubes 32 and the consequential acceleration of any particles within the air to be filtered. This acceleration projects the entrained particles downwardly into the water so that the air which rises upwardly leaves the unit substantially free from impurities. The filtration capabilities of the filter are not affected by the fact that the water level, in certain states of operation of the unit, lies well below the openings 42 of the tubes 32, since the air velocity, and therefore the downward acceleration of the air entrained particles, is so much greater in these states of operation.

The air is drawn from free space above the water 22, through the choke throat 34 and out of the outlet 20 in the direction of the arrow 48. In the process, the choke vane 36 is drawn upwardly by the passage of the air through the throat 34 and as a result, the displacer 38 is raised on the sleeve 40 to lower the water level. This mechanism is entirely self regulatory and will compensate even for sudden large surges of air flowing through the unit. This self regulatory mechanism also has the beneficial effect that when air flow, and therefore air speed through the unit, increases, the surface turbulence of the water 22 will increase to the extent that the water droplets could be entrained within the air stream issuing from the outlet 20. By progressively lowering the water level to a point where the water level is well below the openings 42, the entrainment of water droplets is substantially prevented.

Figure 3:
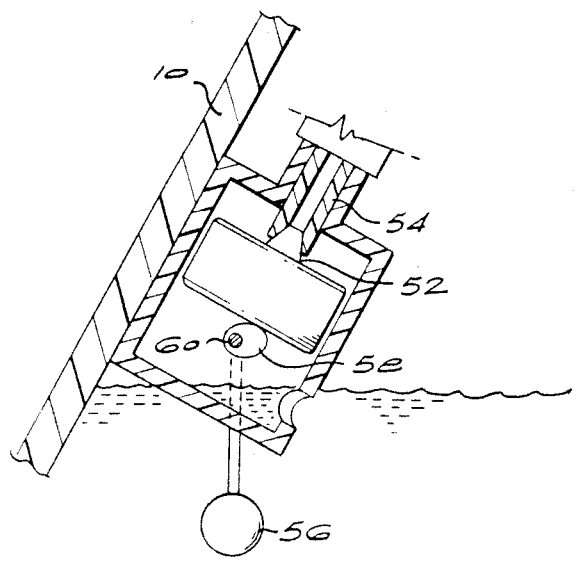
FIG. 3 is a diagrammatic representation of a water supply valve unit forming part of the filtration unit.

The make-up water valve unit 44 is positioned such that the float 50 which raises the needle 52 against the seat 54, will drop the needle 52 away from the seat 54 when the water level is lower than the low water mark 40. When this occurs, make-up water will enter the container 10 automatically to ensure the proper operation of the filter unit. Should the filter unit be tilted, a pendulum 56 and cam 58 arrangement is provided to ensure that make-up water does not flood the container. This will only occur if the container 10 is tilted to the right as is shown in FIG. 3, when the pendulum 56 will rotate the axle 60 to butt the lobe of the cam 58 against the bottom of the float 50. This will result in the needle 52 obturating the inlet formed within the seat 54.

I claim:

1. A gas filtration unit comprising a liquid container, at least one intake gas inlet tube, extending from a source of inlet gas downwardly into the container and opening at a high liquid level within the container, at least one filtered gas outlet formed above the high liquid level in the container and means for automatically varying the liquid level between the high liquid level and a low liquid level, which is below the inlet tube opening, in dependence on the rate of gas flow through the container, said dependence being such that the liquid level goes down as the gas flow rate increases and the liquid level goes up as the gas flow rate decreases.

2. A gas filtration unit according to claim 1 including s plurality of intake gas inlet tubes which extend substantially vertically downwardly towards the surface of the liquid from an intake plenum which is in communication with a source of intake gas through one or more intake gas inlets.

3. A gas filtration unit according to either of the preceding claims in which the liquid level variation means is constituted by a mechanical level variation device, the filtered gas outlet including an outlet tube extending downwardly into the container to an opening above the high liquid level and a liquid displacer element being provided and connected to a choke vane located within the outlet tube in such a manner that the choke vane is raised, in use, as a result of increased gas flow past the choke vane thereby raising the displacer element from the liquid.

4. A gas filtration unit according to claim 3 including means for supplementing the liquid in the container, which comprises a supplementary liquid supply and a float operated valve, the float of which is positioned to open the liquid supply when the liquid level falls below the low liquid level.

5. A gas filtration unit according to claim 4 including means for securing the float of the float operated valve against opening when the gas filtration unit is tilted beyond a predetermined angle relative to the vertical.

6. A gas filtration unit according to claim 5 in which the float securing means comprises a pendulum and cam arrangement located below the float, the pendulum being adapted to rotate the cam to a position in which the cam secures the float in a closed position of the float operated valve when, in use, the gas filtration unit is tilted beyond a predetermined angle relative to the vertical.

7. A gas filtration unit according to claim 1 including means for supplementing the liquid in the container, which comprises a supplementary liquid supply and a float operated valve, the float of which is positioned to open the liquid supply when the liquid level falls below the low liquid level.

8. A gas filtration unit according to claim 7 including means for securing the float of the float operated valve against opening when the gas filtration unit is tilted beyond a predetermined angle relative to the vertical.

9. A gas filtration unit according to claim 8 in which the float securing means comprises a pendulum and cam arrangement located below the float, the pendulum being adapted to rotate the cam to a position in which the cam secures the float in a closed position of the float operated valve when, in use, the gas filtration unit is tilted beyond a predetermined angle relative to the vertical.

10. A gas filtration unit according to claim 1 which is configured to serve as an intake air filter for an internal combustion engine.

* * * * *